(12) United States Patent
Kinoshita et al.

(10) Patent No.: US 8,099,510 B2
(45) Date of Patent: Jan. 17, 2012

(54) RELAY DEVICE AND PROGRAM PRODUCT, ALLOWING CONTINUED COMMUNICATION VIA AN ALTERNATIVE PROTOCOL

(75) Inventors: Masafumi Kinoshita, Sagamihara (JP); Masahiko Nakahara, Machida (JP); Yasuhiro Takahashi, Kawasaki (JP); Yoshiteru Takeshima, Tokyo (JP); Koki Nakashiro, Atsugi (JP)

(73) Assignee: Hitachi, Ltd, Tokyo (JP)

( * ) Notice: Subject to any disclaimer, the term of this patent is extended or adjusted under 35 U.S.C. 154(b) by 1007 days.

(21) Appl. No.: 11/772,844

(22) Filed: Jul. 3, 2007

(65) Prior Publication Data

US 2008/0046574 A1 Feb. 21, 2008

(30) Foreign Application Priority Data

Jul. 3, 2006 (JP) .................................. 2006-183251

(51) Int. Cl.
*G06F 13/00* (2006.01)
(52) U.S. Cl. ....................................... 709/230
(58) Field of Classification Search .................. 709/206, 709/230
See application file for complete search history.

(56) References Cited

U.S. PATENT DOCUMENTS

2006/0085429 A1* 4/2006 Wener et al. ..................... 707/10
2006/0224750 A1* 10/2006 Davies et al. ................. 709/229

FOREIGN PATENT DOCUMENTS

| JP | 10-161945 | 6/1998 |
| JP | 2000-057089 | 2/2000 |
| JP | 2000-253048 | 9/2000 |
| JP | 2005-165658 | 6/2005 |

* cited by examiner

*Primary Examiner* — Robert B Harrell
(74) *Attorney, Agent, or Firm* — Antonelli, Terry, Stout & Kraus, LLP.

(57) ABSTRACT

A communication system in which, even when an HTTP session is disconnected from a mobile device, the HTTP session can be continued or a response from a Web server can be returned to a user, without installing a special application in the mobile device. A load-distributable system is provided for realizing such operation. To that end, in a communication system having a relay device that relays a request from a portable telephone terminal (110) to a Web server (120), the relay device (130) relays a processing request from the portable telephone terminal (110) to the Web server, and stores a processing response from the Web server. The relay device (130) sends the portable telephone terminal a message to the effect that the processing response should be acquired from the relay device (130) or a message with the processing response added.

18 Claims, 9 Drawing Sheets

FIG. 2

| TERMINAL ID | MAIL ADDRESS | COMMUNICATION ADDRESS | DEFAULT TIME-OUT | EXTENDED TIME-OUT |
|---|---|---|---|---|
| XXXXX1 | XXX@XXX.ne.jp | XXXXX...... | 180(Sec) | 300(Sec) |
| ⋮ | ⋮ | ⋮ | ⋮ | ⋮ |
| ⋮ | ⋮ | ⋮ | ⋮ | ⋮ |

FIG. 8

| TERMINAL ID | MAIL ADDRESS | COMMUNICATION ADDRESS |
|---|---|---|
| XXXXX1 | XXX@XXX.ne.jp | XXXXX...... |
| ⋮ | ⋮ | ⋮ |
| ⋮ | ⋮ | ⋮ |

RELAY DEVICE AND PROGRAM PRODUCT, ALLOWING CONTINUED COMMUNICATION VIA AN ALTERNATIVE PROTOCOL

INCORPORATION BY REFERENCE

This application claims a priority from the Japanese patent application No. 2006-183251 filed on Jul. 3, 2006, the entire content of which is incorporated herein by reference.

BACKGROUND OF THE INVENTION

The present invention relates to a technique of relaying communication between a communication terminal and a communication server.

Recently, Web (World Wide Web) servers perform various kinds of processing in reply to processing requests from portable telephone terminals.

When a Web server performs complex processing, processing time in the Web server becomes longer and thus sometimes a HyperText Transfer Protocol (HTTP) session is disconnected. In addition, since a portable telephone terminal communicates by radio, its communication line is frequently disconnected in the course of communication.

In connection with this, in the field of database access processing, Japanese Unexamined Patent Application Laid-Open No. 2000-57089 (hereinafter, referred to as Patent Document 1) discloses a technique in which a Web browser sends a processing request to a Web server, the Web server performs processing of a database offline, and the Web browser periodically sends an HTTP request to the Web server so that the Web browser can acquire a processing result from the Web server when the processing is finished.

SUMMARY OF THE INVENTION

According to the technique described in Patent Document 1, an HTTP request cannot be sent to the same Web server to which an HTTP request was sent the previous time, when workload is distributed among Web servers by a load balancer. Further, according to that technique, it is required to install, in a client-side terminal, a Web browser or an application that periodically sends an HTTP request.

Accordingly, in the case of a mobile device such as a portable telephone terminal, such a Web browser or application must be installed in each device and a program must be developed for such a Web browser or application for each device, which is inconvenient.

The present invention enables the HTTP session to be continued or a response from a Web server to be returned to a user, even when an HTTP session is disconnected from a mobile device such as a portable telephone terminal, without installing a special application in that mobile device, and provides a load-distributable system for realizing this.

According to the present invention, a result of processing in a Web server is stored in a relay device. The relay device sends a message according to a prescribed protocol to a portable telephone terminal, so as to provide a system that performs processing corresponding to the message received by the portable telephone terminal and acquires the processing result from the relay device.

For example, the present invention provides a relay device that relays communication between a communication terminal and a communication server, comprising: a storage part that stores a response from the communication server; and a control part that controls processing of sending a message according to a predetermined protocol to the communication terminal when the response is received.

Thus, according to the present invention, a portable telephone terminal that has received a message according to the prescribed protocol from a load-distributed relay device can perform processing corresponding to the received message and acquire the processing result from the relay device that has stored the processing result of the Web server. Therefore, even when the line is disconnected before receiving the processing result, the portable telephone terminal can assuredly acquire the processing result and continue the processing that was being performed before the disconnection of the line.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 2 is a schematic diagram showing an ID information table;

FIG. 8 is a schematic diagram showing an ID information table; and

DETAILED DESCRIPTION OF THE EMBODIMENTS

Figure 1:
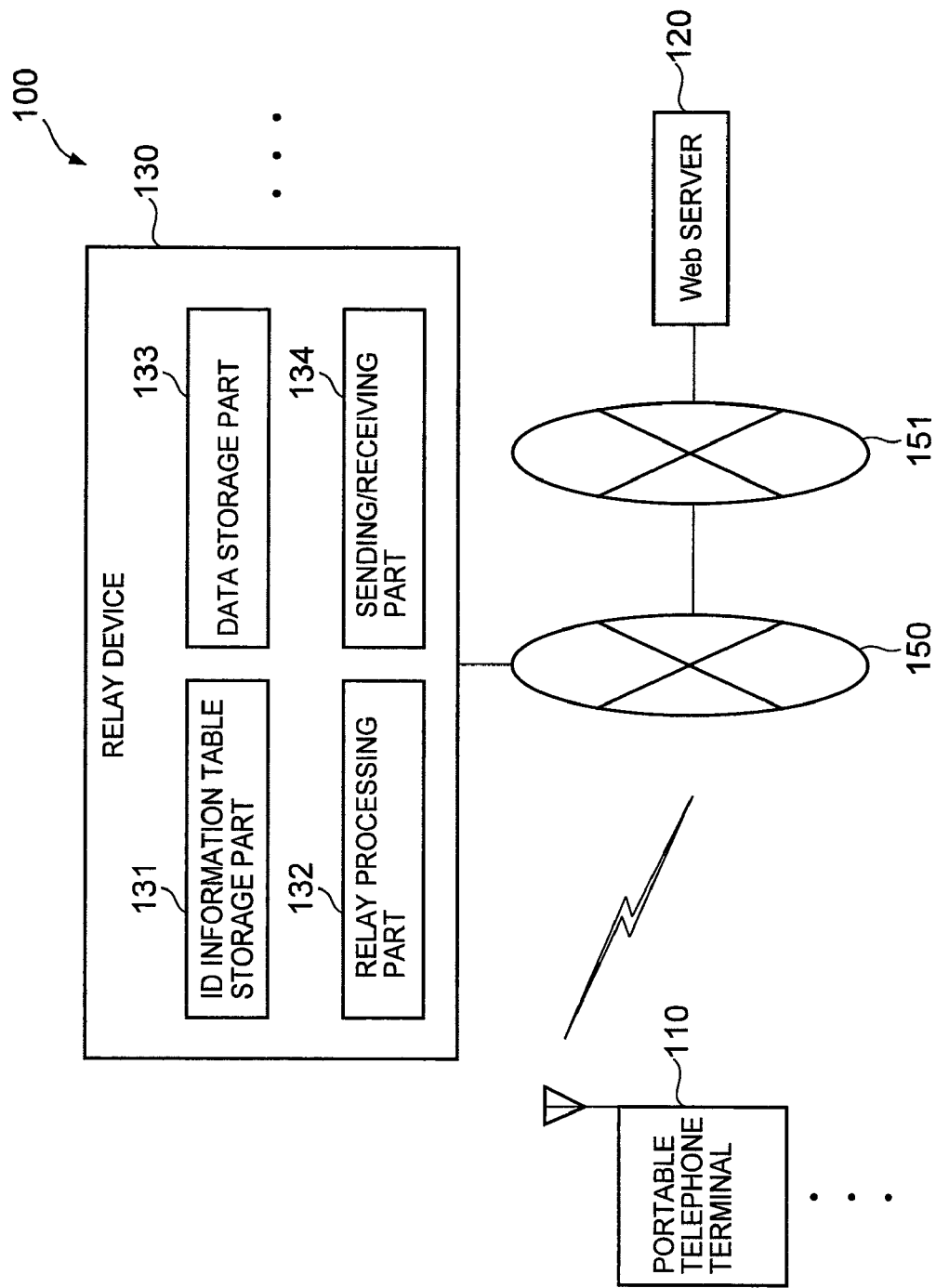
FIG. 1 is a schematic diagram showing a communication system as a first embodiment of the present invention.

FIG. 1 is a schematic diagram showing a communication system 100 as a first embodiment of the present invention.

As shown in the figure, the communication system 100 comprises a portable telephone terminal 110, a Web server 120, and a relay device 130. The portable telephone terminal 110 and the relay device 130 are connected through a carrier communication network 150, and the Web server 120 and the relay device 130 are connected through the Internet 151.

The portable telephone terminal 110 of the present embodiment can be connected to the carrier communication network 150 by radio so that the portable telephone terminal 110 can send and receive data to and from the Web server 120 through the carrier communication network 150 and the Internet 151.

Here, it is arranged that the portable telephone terminal 110 of the present embodiment stores a terminal ID for identifying uniquely the portable telephone terminal 110 in a header (for example, an HTTP header) of a message for requesting some kind of processing to the below-described Web server 120, before sending the message.

Further, the portable telephone terminal 110 of the present embodiment has a Web communication function (an HTTP communication function), a function of sending and receiving mails, a function of receiving messages according to a push-type protocol, and a function of connecting to the below-described relay device 130.

The push-type protocol is protocol used when relay device 130 can push data to a portable telephone terminal, for example, SMPP (Short Message Peer-to-peer Protocol), PAP (Push Access Protocol) etc.

Although FIG. 1 shows only one portable telephone terminal 110, a plurality of portable telephone terminals 110 can be connected to the carrier communication network.

The Web server 120 of the present embodiment performs prescribed processing in reply to a processing request from a portable telephone terminal 110, and sends a processing result as a result response to the portable telephone terminal 110.

As shown in the figure, the relay device 130 comprises an ID information table storage part 131, a relay processing part 132, a data storage part 133, and a sending/receiving part 134. The relay device 130 has a proxy function, a sending/receiving function according to a push-type protocol, and a sending/receiving function according to a mail protocol.

The ID information table storage part 131 stores, for each portable telephone terminal 110, a terminal ID for identifying the portable telephone terminal uniquely, a mail address of the portable telephone terminal 110 in question, a communication address of the portable telephone terminal 110, an initial value of a period for time-out at which a session is disconnected, and an extended value of time-out, at which a session is disconnected.

In detail, the ID information table storage part 131 stores an ID information table 131a as shown in FIG. 2.

The ID information table 131a has a terminal ID registration field 131b, a mail address registration field 131c, a communication address registration field 131d, a default time-out registration field 131e, and an extended time-out registration field 131f.

The terminal ID registration field 131 registers a terminal ID for identifying a portable telephone terminal 110 uniquely. Here, for example, a telephone number, a machine number, subscriber ID or the like, of a portable telephone terminal 110 can be used as a terminal ID.

The mail address registration field 131c registers a mail address of the portable telephone terminal 110.

The communication address registration field 131d registers a communication address that is used by the portable telephone terminal 110 for sending and receiving push-type protocol data through the carrier communication network 150.

The default time-out registration field 131e registers an initial value for time-out on which a session is disconnected.

The extended time-out registration field 131f registers an extended value for time-out at which a session is disconnected.

The relay processing part 132 performs so-called proxy processing. That is, the relay processing part 132 receives a communication request from a portable telephone terminal 110 through the below-described sending/receiving part 134, and relays the received communication request to the Web server 120 through the Internet 151.

Further, the relay processing part 132 receives a processing request from a portable telephone terminal 110, and determines a time-out period for disconnecting a session with the portable telephone terminal 110 according to content of the processing request.

In detail, the relay processing part 132 analyzes a header of a message of a processing request from a portable telephone terminal 110, to specify content of the processing requested from the portable telephone terminal 110. That is, the relay processing part 132 specifies content of the processing requested from the portable telephone terminal 110, based on whether a specific character string exists in the header of the message. When a specific character string does not exist in the header of the message, the relay processing part 132 selects the initial value for time-out, which is registered in the default time-out registration field 131e of the ID information table 131a. On the other hand, when a specific character string exists in the header, the relay processing part 132 selects the extended value for time-out, which is registered in the extended time-out registration field 131f of the ID information table 131a. Thus, the period specified by the initial value or the extended value is determined as the time-out period for the session.

It is desirable that sending of another request from the portable telephone terminal 110 be prohibited until the time-out period elapses.

Here, when some type of character string exists in a header of a message of a processing request from a portable telephone terminal 110, a suitable selection may be made as to an extended value for time-out, depending on content of the processing that the Web server 120 is requested to perform. For example, in the present embodiment, the initial value for time-out is selected in the case where a request is, for example, a simple one for acquisition of data such as a front page from the Web server 120. In the other cases where processing is expected to require a lot of time such as, for example, a case where a request follows Simple Object Access Protocol (SOAP) and a case where a request includes a specific User-Agent header or Cookie information, the extended value for time-out is selected.

Further, when the relay processing part 132 receives a response of the Web server to a request from a portable telephone terminal 110, then the relay processing part 132 stores the response into the below-described data storage part 133.

Then, in the case where the time-out period determined by the request from the portable telephone terminal 110 has not elapsed, the relay processing part 132 relays the response stored in the data storage part 133 to the portable telephone terminal 110. On the other hand, in the case where the time-out period has elapsed, the relay processing part 132 suitably selects the push-type protocol or the mail protocol by a predetermined algorithm, and sends a message according to the selected protocol to the portable telephone terminal 110.

Here, in the case where a message according to the push-type protocol is sent to the portable telephone terminal 110, the message includes a relay device Uniform Resource Locator (URL) for connecting to the relay device 130 and information ID for identifying the response received from the Web server. Receiving the message, the portable telephone terminal 110 connects to the relay device 130 corresponding to the relay device URL through the carrier communication network 150 according to the received message, and acquires the result response corresponding to the information ID included in the received message from the relay device 130.

On the other hand, in the case of a message according to the mail protocol, the response is attached to the message.

The data storage part 133 stores a response received from the Web server 120, associating the response with an information ID for identifying the response uniquely.

The sending/receiving part 134 is an input/output interface for sending and receiving information through the carrier communication network 150.

The relay device 130 of the above configuration can be implemented by an ordinary computer. For example, the ID information table storage part 131 and the data storage part 133 can be implemented by external storage such as a hard disk. The relay processing part 132 can be implemented when a Central Processing Unit (CPU) executes a predetermined program stored in the external storage. The sending/receiving part 134 can be implemented by a Network Interface Card (NIC).

Furthermore, the predetermined program may be downloaded, to an external storage device, from a storage medium via a reading device, or from a network, via a communication device. The program may be directly downloaded from the medium via the reading device, or from the network via the communication device, to be executed by the CPU. It is assumed that the program includes code or a module for making the computer perform predetermined processing. In addition, "medium" includes all media, including storage media, communication media, and the like, that can provide a program.

The carrier communication network 150 includes a base station for sending and receiving information to and from a portable telephone terminal 110 by radio, and a gateway for performing protocol conversion between the Internet 151 and the carrier communication network 150. Whenever a portable telephone terminal 110 connected to the carrier communication network 150 connects to the Web server 120, the portable telephone terminal 110 connects to the Web server 120 through the relay device 130.

In the present embodiment, a plurality of relay devices is connected to the carrier communication network 150 to distribute workload. However, this mode is not restrictive, and the processing may be performed by only one relay device 130.

Figure 3:
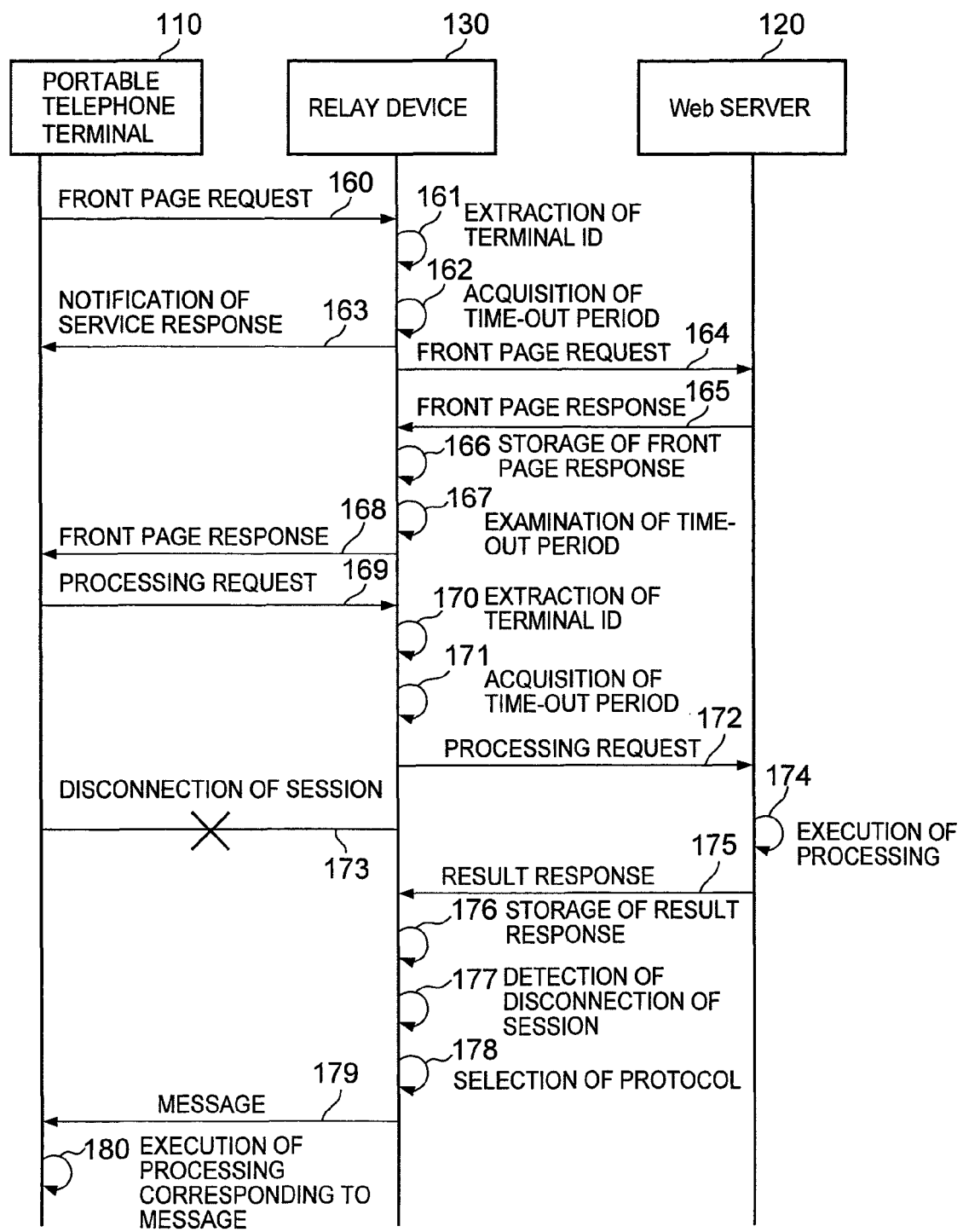
FIG. 3 is a sequence diagram showing processing in sending and receiving information in the communication system.

Processing of sending and receiving information in the communication system 100 of the above-described configuration will be described referring to the sequence diagram shown in FIG. 3.

First, a portable telephone terminal 110 sends a request for a front page to the Web server 120 (160). The HTTP header of this front page request includes the terminal ID for identifying the portable telephone terminal 110 uniquely.

The front page request sent from the portable telephone terminal 110 is received by a relay device 130 through the carrier communication network 150. The relay device 130 extracts the terminal ID from the HTTP header of the front page request (161), confirms that the HTTP header does not include predetermined kinds of data, and acquires the default time-out value corresponding to the extracted terminal ID from the default time-out registration field 131e of the ID information table 131a (162).

The relay device 130 sends a service notification response to the portable telephone terminal 110 as the sender of the front page request (163). At that time, the HTTP header of the service notification response may include information (for example, a Retry-After header) that prohibits the portable telephone terminal 110 from sending of another front page request.

Further, the relay device 130 sends the front page request received from the portable telephone terminal 110 to the Web server 120 (164).

Receiving the front page request, the Web server 120 sends a front page response corresponding to the request to the portable telephone terminal 110 (165).

The front page response sent from the Web server 120 is received by the relay device 130 through the carrier communication network 150. The received front page response is stored in the data storage part 133 of the relay device 130 (166).

Further, when the relay device 130 receives the front page response, the relay device 130 examines whether the time-out period acquired in the step 162 has elapsed or not (167). Here, it is assumed that the time-out period has not elapsed.

Then, in the case where the time-out period has not elapsed, the relay device 130 sends the front page response stored in the data storage part 133 to the portable telephone terminal 110 (168).

Next, through the received front page response, the portable telephone terminal 110 sends the Web server 120 a processing request that requests the Web server 120 to perform specific processing (169). The HTTP header of this processing request includes the terminal ID for identifying the portable telephone terminal 110.

The processing request sent from the portable telephone terminal 110 is received by the relay device 130 through the carrier communication network 150. The relay device 130 extracts the terminal ID from the HTTP header of the processing request (170), confirms that the HTTP header includes a predetermined data, and acquires the extended time-out value corresponding to the extracted terminal ID from the extended time-out registration field 131f of the ID information table 131a (171).

Further, the relay device 130 sends the processing request received from the portable telephone terminal 110 to the Web server 120 (172).

Here, it is assumed that the session between the portable telephone terminal 110 and the relay device 130 is disconnected (173).

Receiving the processing request, the Web server 120 performs the processing corresponding to the processing request (174), and sends, as a result response, a result of the processing to the portable telephone terminal 110 (175).

The result response sent from the Web server 120 is received by the relay device 130 through the carrier communication network 150. The received result response is stored in the data storage part 133 of the relay device 130 (176).

Then, when the relay device 130 detects disconnection of the session between the portable telephone terminal 110 and the relay device 130 (177) the relay device 130 suitably selects a protocol for sending to the portable telephone terminal 110 (178), and sends a message corresponding to the selected protocol to the portable telephone terminal 110 (179).

Here, the present embodiment assumes that a protocol can be selected from the push-type protocol and the mail protocol. The method of selection follows the following selection methods (1)-(5).

(1) The relay device 130 tries a session with the portable telephone terminal 110 according to the push-type protocol, and when the number of times, that the relay device 130 detects disconnection of the session with the portable telephone terminal 110, reaches a prescribed number, within a certain period, then the relay device 130 selects the mail protocol.

(2) When the relay device 130 detects disconnection or time-out of the session with the Web server 120, then the relay device 130 selects the mail protocol.

(3) When the number of lines (the number of portable telephone terminals) that the relay device 130 handles at the same time has reached a prescribed threshold, then the relay device 130 selects the mail protocol.

(4) When the usage rate of the CPU or the memory of the relay device 130 has reached a prescribed threshold, then the relay device 130 selects the mail protocol.

(5) In cases other than (1)-(4), the relay device 130 selects the push-type protocol.

Here, the certain time period and the prescribed number of times in the selection method (1), and the thresholds in the selection methods (3) and (4), do not need to be constant values at all times, and can be changed according to the content of the processing that the Web server has been requested to perform. For example, it is possible that these values, in the case where a processing request from a portable telephone terminal 110 includes at least one of: the enquiry character, User-Agent header and Cookie information, are different from values in the case where the processing request includes none of them.

Further, in the present embodiment, when the relay device 130 selects the push-type protocol, then the relay device 130 sends a message that includes a data ID for identifying the result response stored in the data storage part 133 and the relay device URL, i.e., location information of the relay device 130, to the portable telephone terminal 110. On the other hand, when the relay device 130 selects the mail protocol, then the relay device 130 sends a message, accompanied by the result response stored in the data storage part 133, to the portable telephone terminal 110.

It is possible that, in the case where the mail protocol is selected and disconnection or time-out of the session with the Web server 120 is not detected, the relay device 130 sends a message also including the relay device URL, i.e., the location information of the relay device 130, to the portable telephone terminal 110.

Receiving such a message, the portable telephone terminal 110 performs processing according to the received message (180).

Figure 4:
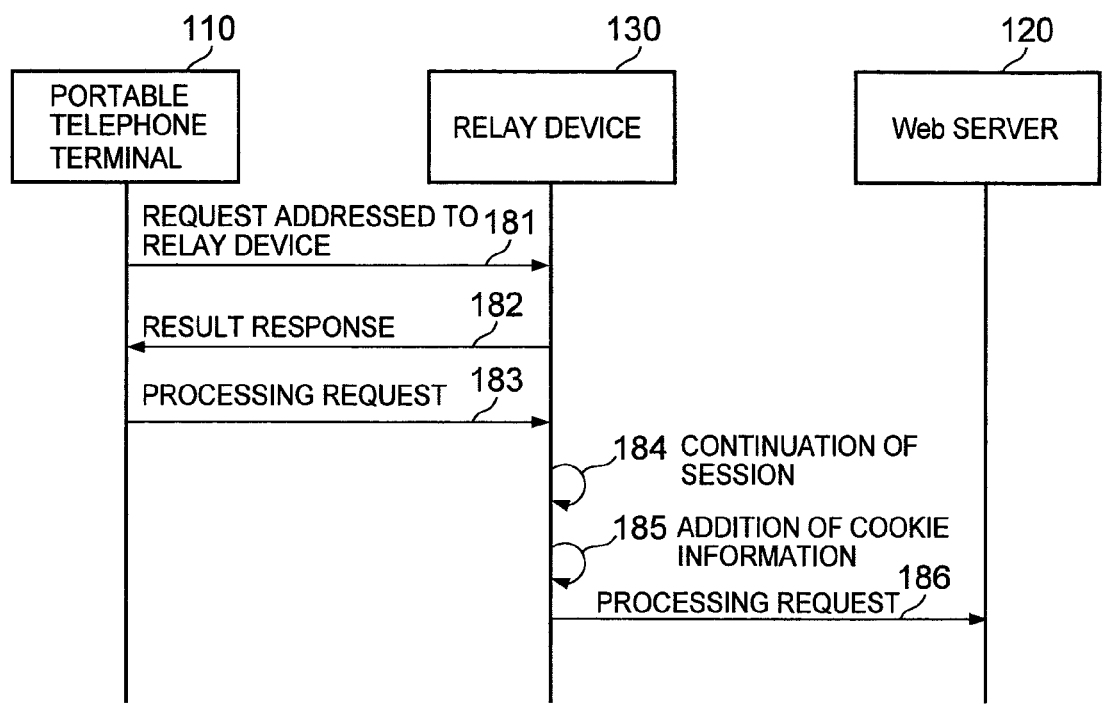
FIG. 4 is a sequence diagram showing processing performed when a portable telephone terminal receives a message according to a push-type protocol.

FIG. 4 shows a sequence diagram showing processing performed in the case where the portable telephone terminal 110 receives a message according to the push-type protocol.

Here, when the relay device 130 selects the push-type protocol, the relay device 130 sends a message including the relay device URL to the portable telephone terminal 110, and the portable telephone terminal 110 sends a request addressed to the relay device URL included in the received message (181). Here, based on the relay device URL included in the message, the portable telephone terminal 110 can uniquely identify the relay device 130 with which the portable telephone terminal 110 had a session before disconnection of the session (173), and thus can continue the disconnected session.

The relay device 130 receives the request addressed to the relay device URL, and sends the result response (which has been received from the Web server 120 and stored in the data storage part 133) to the portable telephone terminal 110 (182).

Then, through the received result response, the portable telephone terminal 110 sends a next processing request (183), and continues the session (184). Further, in the case where the processing request received from the portable telephone terminal 110 does not include Cookie information required for a session with the Web server 120, then the relay device 130 adds the Cookie information to the processing request (185).

The relay device 130 sends the processing request to the Web server 120 to continue the session between the portable telephone terminal 110 and the Web server 120 (186).

On the other hand, when the relay device 130 selects the mail protocol, the relay device 130 adds the result response received from the Web server 120 to a mail message. In the case where time-out has not occurred in the Web server 120, then the relay device 130 also adds the relay device URL to the mail message. Then, the relay device 130 sends the mail message to the portable telephone terminal 110.

By receiving such a mail, the portable telephone terminal 110 receives, as a message of the mail, the result response from the Web server 120. In the case where the message includes the relay device URL, the session can be continued when the portable telephone terminal 110 sends an HTTP request to the relay device URL.

Figure 5:
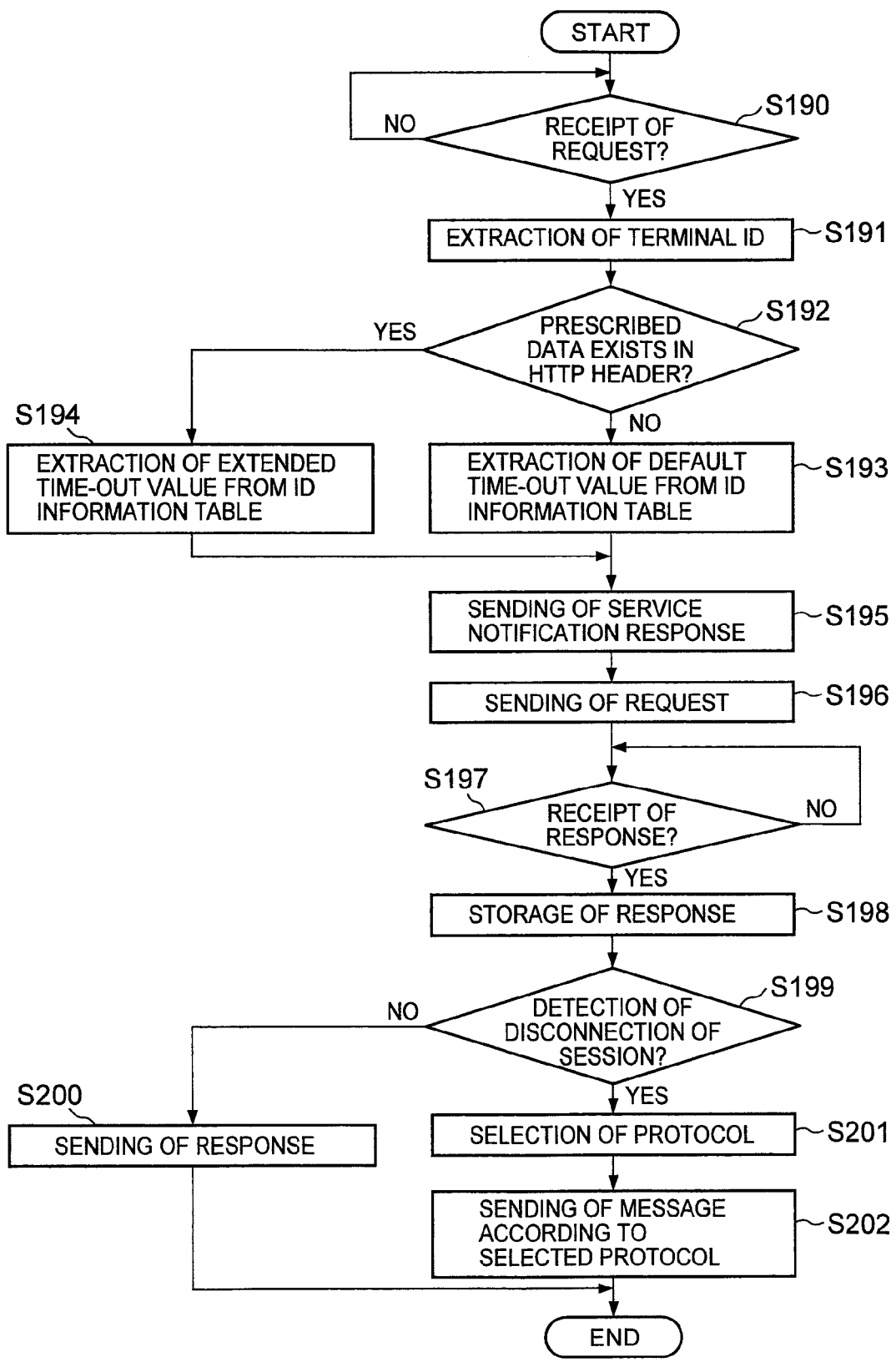
FIG. 5 is a flowchart showing processing performed when a relay device receives a request from a portable telephone terminal.

FIG. 5 is a flowchart showing processing performed when the relay device 130 receives a request from the portable telephone terminal 110.

When the relay device 130 receives a request from the portable telephone terminal 110 (S190), the relay device 130 extracts the terminal ID included in the HTTP header of the received request (S191).

Then, in the case where the HTTP header of the received request does not include the predetermined data (S192), the relay device 130 extracts the default time-out value corresponding to the extracted terminal ID from the default time-out registration field 131*e* of the ID information table 131*a* (S192).

On the other hand, in the case where the HTTP header of the received request includes the predetermined data (S193), the relay device 130 extracts the extended time-out value corresponding to the extracted terminal ID from the extended time-out registration field 131*f* of the ID information table 131*a* (S194).

For example, in the case where the request follows SOAP or the case where the HTTP header includes a specific User-Agent header or Cookie information, then the relay device 130 extracts the extended time-out value. Otherwise, the relay device 130 extracts the default time-out value.

The relay device 130 sends a service notification response to the portable telephone terminal 110 (S195).

Further, the relay device 130 sends the request received from the portable telephone terminal 110 to the Web server 120 (S196).

Then, when the relay device 130 receives a response from the Web server 120 (S197), the relay device 130 stores the received response in the data storage part 133 (S198).

Next, the relay device 130 judges whether the session with the portable telephone terminal 110 has been disconnected or not (S199).

In the case where the session has not been disconnected (S199), the relay device 130 sends the response stored in the data storage part 133 to the portable telephone terminal 110 (S200), to end the processing.

On the other hand, in the case where the session has been disconnected (S199), the relay device 130 selects a protocol by the prescribed selection method (S201), and sends a message according to the selected protocol (S202), to end the processing.

Here, in the case where the push-type protocol is selected in step S202 and the relay device 130 receives a send request specifying the data ID for identifying the response from the portable telephone terminal 110, then the relay device 130 sends the response stored in the data storage part 133 to the portable telephone terminal 110.

Figure 6:
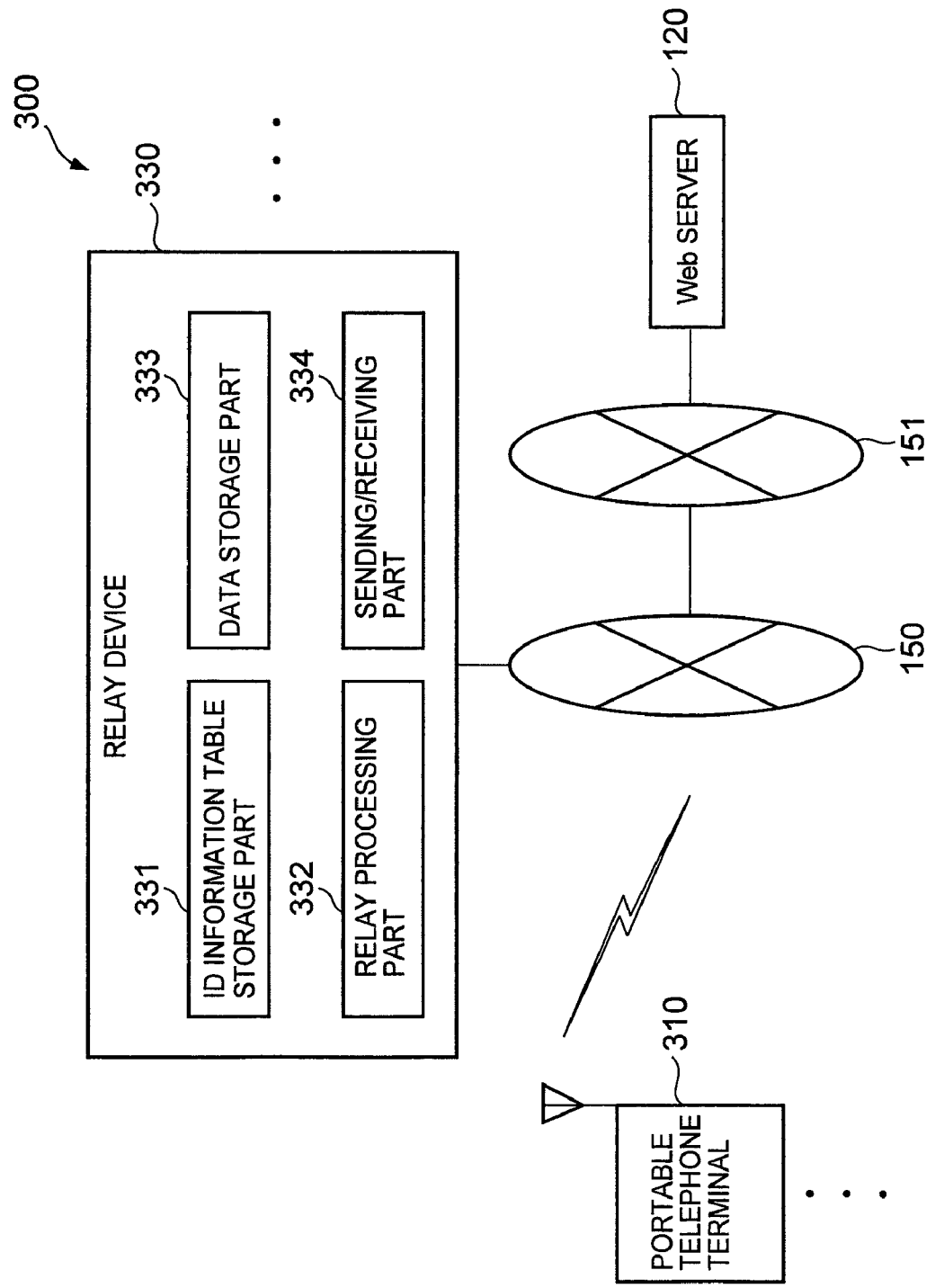
FIG. 6 is a schematic diagram showing a communication system.

In the above-described embodiment, the relay device 130 is connected to the carrier communication network 150. This mode is not restrictive. For example, as the communication system 300 shown in FIG. 6, it is possible to connect a relay device 330 to the Internet 151.

In such a case, the address of the relay device 330 is stored in advance in a portable telephone terminal 310. When the portable telephone terminal 310 connects to the Web server 120, connection is established through the relay device 330.

The processing performed in the above-described relay device 130 or 330 can be distributed. For example, it is possible to provide a mail server that sends prescribed messages to a portable telephone terminal 110, 310, a push-type protocol server that sends prescribed messages according to the push-type protocol to a portable telephone terminal 110, 310, and a database server that stores the ID information table 131*a*, to distribute the processing performed in the relay device 130 or 330.

Figure 7:
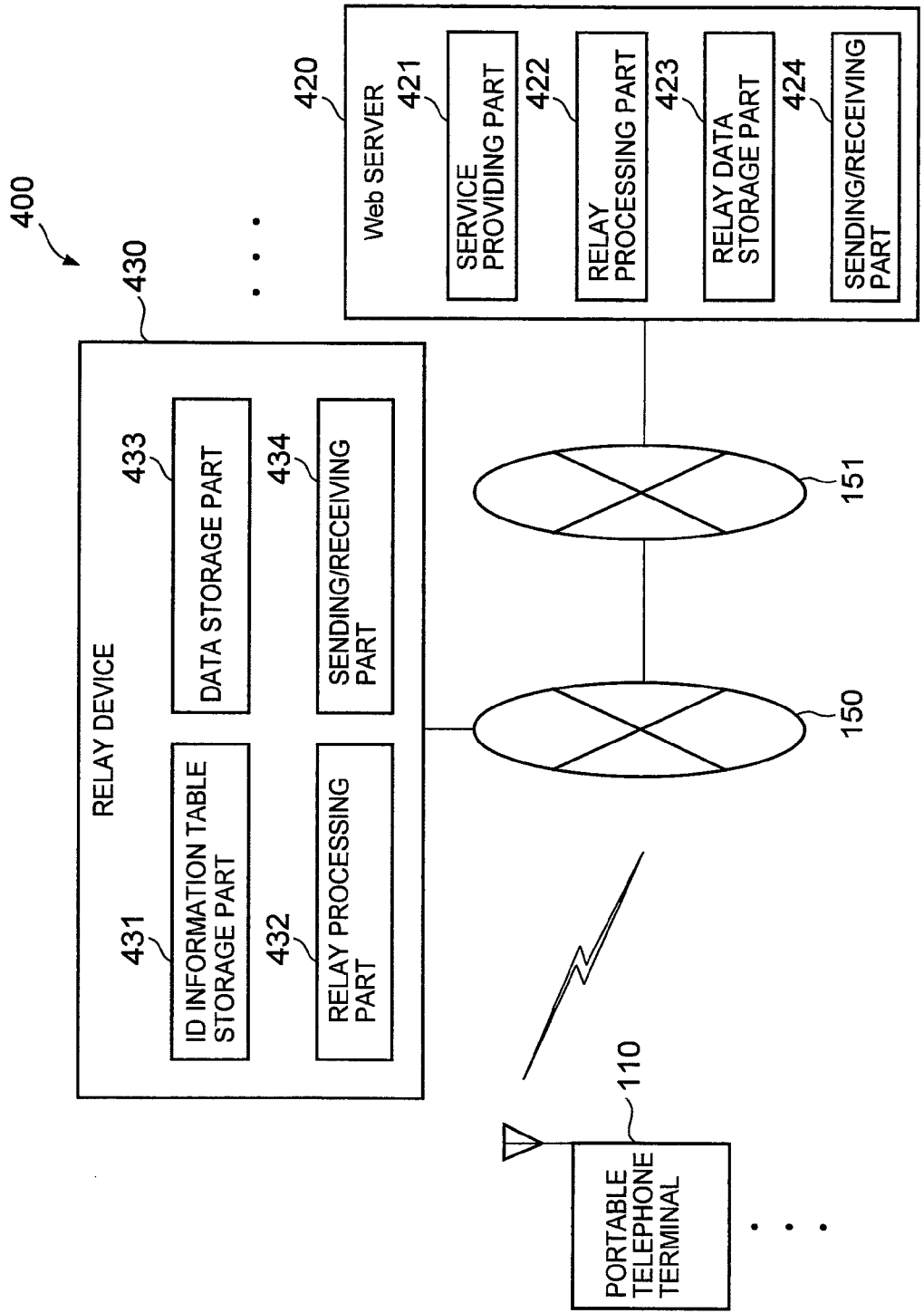
FIG. 7 is a schematic diagram showing a communication system as a second embodiment of the present invention.

FIG. 7 is a schematic diagram showing a communication system 400 as a second embodiment of the present invention.

As shown in the figure, the communication system 400 comprises a portable telephone terminal 110, a Web server 420 and a relay device 430.

The portable telephone terminal 110 of the present embodiment can be connected to a carrier communication network 150 by radio, similarly to the first embodiment, so that the portable telephone terminal 110 can send and receive data to and from the Web server 420 through the carrier communication network 150 and the Internet 151.

The portable telephone terminal 110 of the present embodiment stores a terminal ID for identifying uniquely the portable telephone terminal 110 in a header (for example, an HTTP header) of a message, when the message is sent requesting some kind of processing to the below-described Web server 420, and the message is sent.

Further, the portable telephone terminal 110 of the present embodiment has a function of sending and receiving mails, and a function of receiving a message according to a push-type protocol and connecting to the below-described relay device 430.

The Web server 420 of the present embodiment sends a portable telephone terminal 110 a temporary response (hereinafter, referred to as a processing start response) for notifying start of processing, in reply to a processing request from the portable telephone terminal 110, and performs prescribed processing. Then, the Web server puts a processing result (hereinafter, referred to as a result response) in a request (hereinafter, referred to as a relay processing request) in order to entrust the subsequent processing to the relay device 430, and sends the request.

As shown in the figure, the Web server 420 of the present embodiment comprises a service providing part 421, a relay processing part 422, a relay data storage part 423 and a sending/receiving part 424.

The service providing part 421 receives a processing request from the portable telephone terminal 110 through the below-described sending/receiving part 424, performs the processing corresponding to the received processing request, and generates a result response, i.e., a result of the processing.

The relay processing part 422 generates a relay processing request including a result response generated by the service providing part, and sends the relay processing request to the relay device 430 through the below-described sending/receiving part 424.

Here, the relay processing request includes also the terminal ID included in the HTTP header of the portable telephone terminal 110 that has sent the processing request.

The relay processing part of the present embodiment does not need to perform so-called proxy processing, differently from the first embodiment.

The sending/receiving part 424 sends and receives data through the Internet 151.

The Web server 420 of the above-described configuration can be implemented by an ordinary computer.

For example, the service providing part 421 and the relay processing part 422 can be implemented when a CPU executes predetermined programs stored in external storage such as a hard disk. The relay data storage part 423 can be implemented by the external storage such as a hard disk. The sending/receiving part 424 can be implemented by an NIC.

As shown in the figure, the relay device 430 of the present embodiment comprises an ID information table storage part 431, a relay processing part 432, a data storage part 133 and a sending/receiving part 134.

The ID information table storage part 431 stores, for each portable telephone terminal 110, a terminal ID for identifying the portable telephone terminal uniquely, a mail address of the portable telephone terminal 110 in question, and a communication address of the portable telephone terminal 110.

In detail, the ID information table storage part 431 stores an ID information table 431*a* as shown in FIG. 8. The present embodiment can be realized also by a configuration in which not the relay device 430 but the Web server 420 has the ID information table storage part 431 and the relay device 430 acquires the ID information table 431*a* by receiving a relay processing request.

The ID information table 431*a* has a terminal ID registration field 431*b*, a mail address registration field 431*c*, and a communication address registration field 431*d*.

The terminal ID registration field 431*b* registers a terminal ID for identifying a portable telephone terminal 110 uniquely. Here, for example, a telephone number, a machine number, or the like, can be used as a terminal ID.

The mail address registration field 431*c* registers a mail address of the portable telephone terminal 110.

The communication address registration field 431*d* registers a communication address that is used by the portable telephone terminal 110 for sending and receiving data through the carrier communication network 150.

When the relay processing part 432 receives a relay processing request from the Web server 420 through the below-described sending/receiving part 134, the relay processing part 432 stores the relay processing request in the below-described data storage part 133.

The relay processing part 432 selects a push-type protocol or a mail protocol by a predetermined algorithm, and sends a message according to the selected protocol to the portable telephone terminal 110.

Here, in the case where a message according to the push-type protocol is sent to the portable telephone terminal 110, the message includes a relay device URL for connecting to the relay device 430 and data ID for identifying the relay processing request received from the Web server. Receiving the message, the portable telephone terminal 110 connects to the relay device 430 corresponding to the relay device URL through the carrier communication network 150 according to the received message, and acquires the result response corresponding to the data ID included in the received message from the relay device 430.

On the other hand, in the case of a message according to the mail protocol, the massage includes the result response.

Here, similarly to the first embodiment, the present embodiment assumes that a protocol can be selected from the push-type protocol and the mail protocol. The method of selection is as according to the following selection methods (1)-(5).

(1) When the relay device 430 tries a session with the portable telephone terminal 110 according to the push-type protocol, and when the number of times that the relay device 430 detects disconnection of the session reaches a prescribed number, within a certain period, then the relay device 430 selects the mail protocol.

(2) When the number of lines (the number of portable telephone terminals) that the relay device 430 handles at the same time has reached a prescribed threshold, then the relay device 430 selects the mail protocol.

(3) When the usage rate of the CPU or the memory of the relay device 430 has reached a prescribed threshold, then the relay device 430 selects the mail protocol.

(4) In cases other than (1)-(3), the relay device 430 selects the push-type protocol.

The data storage part 133 stores the relay processing request received from the Web server 420, associating the relay processing request with the information ID for identifying the relay processing request uniquely.

The sending/receiving part 134 is an input/output interface for sending and receiving information through the carrier communication network 150.

The relay device 430 of the above configuration can be implemented by an ordinary computer. For example, the ID information table storage part 431 and the data storage part 133 can be implemented by an external storage such as a hard disk. The relay processing part 432 can be implemented when a CPU executes a predetermined program stored in the external storage. The sending/receiving part 134 can be implemented by an NIC.

Figure 9:
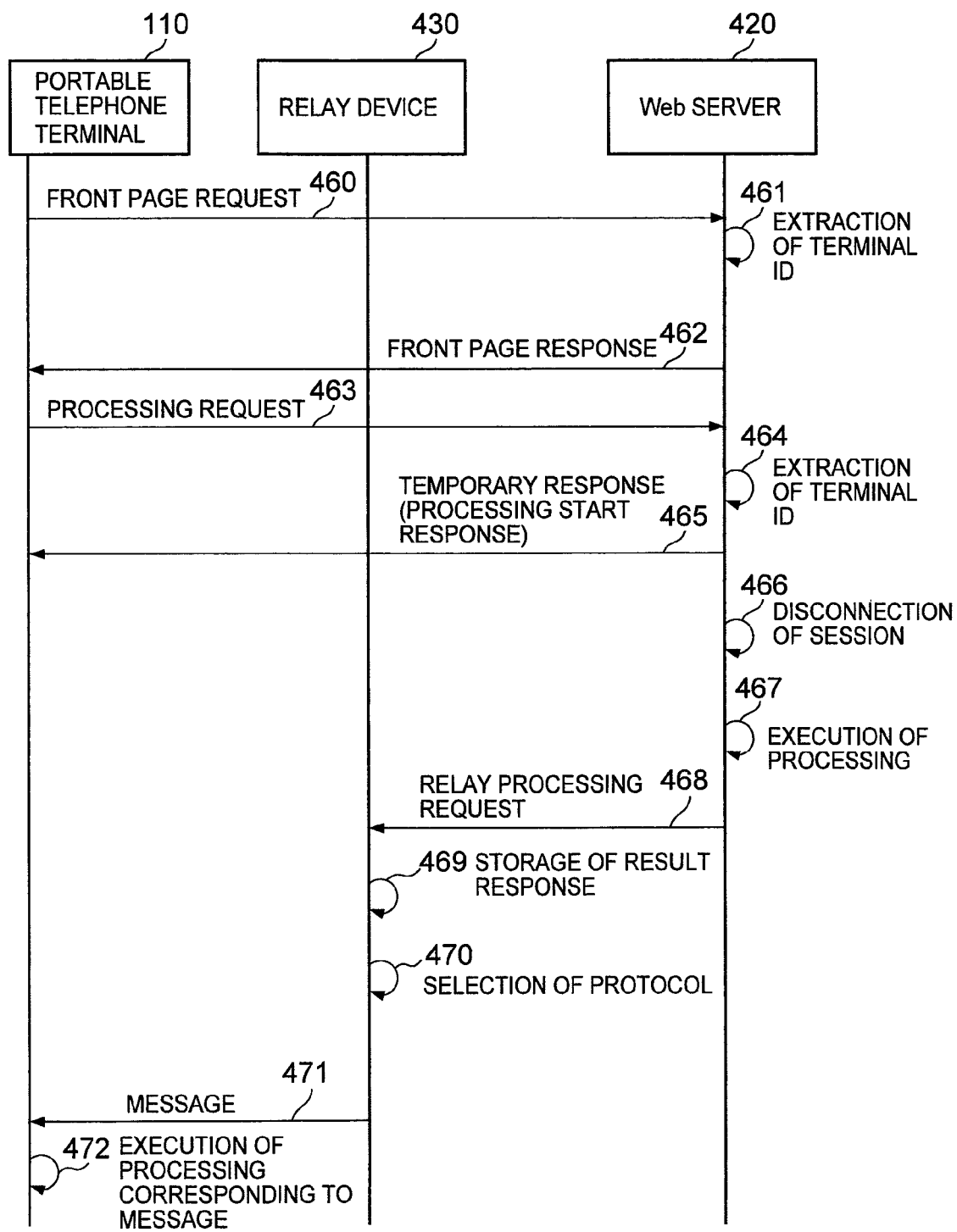
FIG. 9 is a sequence diagram showing processing in sending and receiving information in the communication system.

Processing of sending and receiving information in the communication system 400 of the above-described configuration will be described, referring to the sequence diagram shown in FIG. 9.

First, a portable telephone terminal 110 sends a front page request to the Web server 420 (460). The HTTP header of this front page request includes the terminal ID for identifying the portable telephone terminal 110 uniquely.

The front page request sent from the portable telephone terminal 110 is received by the Web server 420 through the carrier communication network 150 and the Internet 151. The Web server 420 extracts the terminal ID from the HTTP header of the front page request (461).

Further, the Web server 420 sends a front page response corresponding to the front page request received from the portable telephone terminal 110 to the portable telephone terminal 110 (462).

Next, through the received front page response, the portable telephone terminal 110 requests the Web server 420 to perform specific processing (463). The HTTP header of this processing request includes the terminal ID for identifying the portable telephone terminal 110 uniquely.

Receiving the front page request sent from the portable telephone terminal 110, the Web server 420 extracts the terminal ID from the HTTP of the processing request (464).

Then, the Web server 120 sends a temporary service notification response (a processing start response) to the portable telephone terminal 110 (465), and disconnects the session with the portable telephone terminal (466).

Further, the Web server 420 performs the processing corresponding to the processing request received from the portable telephone terminal 110 (467), and sends the relay device 430 a relay processing request that includes a result of the processing as a result response (468).

The relay processing request sent from the Web server 420 is received by the relay device 430 through the carrier communication part 150, and the received relay processing request is stored in the data storage part 433 of the relay device 430 (469).

Then, the relay device 430 suitably selects a protocol used for sending to the portable telephone terminal 110 (470), and sends a message according to the selected protocol to the portable telephone terminal 110 (471).

Receiving the message, the portable telephone terminal 110 performs the processing corresponding to the received message (472).

In detail, in the case where the portable telephone terminal 110 receives the message according to the push-type protocol, the portable telephone terminal 110 sends a sending request that specifies the data ID for identifying the result response stored in the data storage part 133 to the relay device 430 corresponding to the relay device URL included in the message, and receives the result response from the relay device 430. Further, the relay device 430 and the portable telephone terminal 110 can continue this session and continue processing after the result response.

On the other hand, in the case where the portable telephone terminal 110 receives the message according to the mail protocol, the portable telephone terminal 110 displays the received message.

In the above-described embodiment, a time-out period for a session can be selected from two values, i.e., the default time-out and the extended time-out. However, this mode is not restrictive. It is possible to arrange that a time-out period can be selected from a larger number of time-out periods. In that case, it is suitable to arrange that a time-out period can be selected from a plurality of time-out periods depending on conditions of load processing performed by the Web server.

Further, it is possible to prohibit sending of another request by executing a Web browser or a certain application on a portable telephone terminal. In that case, the Web browser or the application may be installed in advance in the portable telephone terminal, or a program for prohibiting sending of another request may be sent from a relay device or a Web server and then executed.

Further, the present embodiment uses a portable telephone terminal 110. However, this mode is not restrictive, and any terminal that can connect to a Web server through a network or a relay device can be used.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. A relay device that relays communication between a communication terminal and a communication server, the relay device comprising:
    a terminal information storage part that stores information of an alternative protocol which can be used by the communication terminal, where the alternative protocol is stored in association with a terminal ID for uniquely identifying the communication terminal;
    a data storage part that stores a response from the communication server;
    a control part that performs, if a communication via a normal protocol with a communication terminal as a destination of the response is disconnected, a processing to change protocols, which processing extracts protocol information of the alternative protocol associated with the ID of the communication terminal from the terminal information storage part, and sends the response by using the protocol information thus extracted, to the communication terminal as the destination; and
    when a predetermined character string exists in a request from the communication terminal to the communication server, the control part controls a processing of sending, to the communication terminal, a message that changes a time-out period for a session from the communication terminal to the communication server.

2. A relay device of claim 1, wherein:
the alternative protocol makes the communication terminal send a request for receiving the response.

3. A relay device of claim 1, wherein:
the alternative protocol sends, to the communication terminal, a message with the response attached.

4. A relay device of claim 1, wherein:
the alternative protocol, which can be used by the communication terminal, includes at least any one protocol of: a push-type protocol that makes the communication terminal send a receiving request for the response, a mail protocol that sends, to the communication terminal a message with the response added, and a HTTP protocol.

5. A relay device of claim 1, wherein:
the control part determines that a communication with the communication terminal is disconnected when disconnection of a session with the communication terminal is detected a predetermined number of times.

6. A relay device of claim 1, wherein:
the control part determines that a communication with the communication terminal is disconnected when a time-out period for a session with the communication server elapses.

7. A relay device of claim 1, wherein:
the control part further performs the processing to change protocols when a number of lines of communication terminals connected to the relay device reaches a predetermined number.

8. A relay device of claim 1, wherein:
the relay device has a CPU and a memory; and
the control part further performs the processing to change protocols when a usage rate of one of the CPU and the memory exceeds a predetermined value.

9. A relay device of claim 1, wherein:
the normal protocol is a HTTP protocol; and
the alternative protocol, which can be used by the communication terminal, includes at least any one protocol of: a push-type protocol that makes the communication terminal send a receiving request for the response, and a mail protocol that sends, to the communication terminal a message with the response added.

10. A program product having a tangible, non-transitory medium embodying a program executable on a computer, the program product comprising code such that the program makes the computer;
store information of an alternative protocol which can be used by a communication terminal, where the alternative protocol is stored in association with a terminal ID for uniquely identifying the communication terminal;
store a response from a communication server;
control processing of relaying a request from a communication terminal to the communication server;
processing to, if a communication via a normal protocol with a communication terminal as a destination of the response is disconnected, change protocols, which processing extracts protocol information of the alternative protocol associated with the ID of the communication terminal;
sending the response by using the protocol information thus extracted, to the communication terminal as the destination; and
when a predetermined character string exists in a request from the communication terminal to the communication server, then the code further includes a code for performing processing of sending, to the communication terminal, a message that changes a time-out period for a session from the communication terminal to the communication server.

11. A program product of claim 10, wherein:
the alternative protocol makes the communication terminal send a request for receiving the response.

12. A program product of claim 10, wherein:
the alternative protocol sends, to the communication terminal, a message with the response added.

13. A program product of claim 10, wherein:
the alternative protocol, which can be used by the communication terminal, includes at least any one protocol of: a push-type protocol that makes the communication terminal send a receiving request for the response, a mail protocol that sends, to the communication terminal, a message with the response added, and a HTTP protocol.

14. A program product of claim 10, wherein:
the code includes a code for determining that a communication with the communication terminal is disconnected when disconnection of a session with the communication terminal is detected a predetermined number of times.

15. A program product of claim 10, wherein:
the code includes a code for determining that a communication with the communication terminal is disconnected when a time-out period for a session with the communication server elapses.

16. A program product of claim 10, wherein:
the code includes a code for further performing the processing to change protocols when a number of lines of communication terminals connected to the computer reaches a predetermined number.

17. A program product of claim 10, wherein:
the computer has a CPU and a memory; and
the code further includes a code for performing the processing to change protocols when a usage rate of one of the CPU and the memory exceeds a predetermined value.

18. A program product of claim 10, wherein:
the normal protocol is a HTTP protocol; and
the alternative protocol, which can be used by the communication terminal, includes at least any one protocol of: a push-type protocol that makes the communication terminal send a receiving request for the response, and a mail protocol that sends, to the communication terminal a message with the response added.

* * * * *